(12) United States Patent
Leneman

(10) Patent No.: US 7,281,156 B1
(45) Date of Patent: Oct. 9, 2007

(54) SYSTEM AND METHOD FOR WRITING DATA TO A DISK DRIVE ASSEMBLY TO MINIMIZE THE EFFECT OF A SINGLE HEAD FAILURE

(75) Inventor: Tuvia Leneman, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 762 days.

(21) Appl. No.: 10/802,584

(22) Filed: Mar. 17, 2004

(51) Int. Cl.
*G06F 11/00* (2006.01)

(52) U.S. Cl. .................. 714/5; 711/111; 711/112; 360/48

(58) Field of Classification Search ................ 714/5; 711/111, 112; 360/48
See application file for complete search history.

(56) References Cited

U.S. PATENT DOCUMENTS 5,245,594 A * 9/1993 Shimizu ................. 360/64
2003/0028719 A1* 2/2003 Rege ..................... 711/112
2004/0246614 A1* 12/2004 Wach et al. .............. 360/63

* cited by examiner

*Primary Examiner*—Michael Maskulinski
(74) *Attorney, Agent, or Firm*—Krishnendu Gupta; Scott A. Ouellette

(57) ABSTRACT

A method of writing data to a disk drive system including a plurality of disks and a plurality of heads, each head for writing data to a plurality of sectors on a surface of one of the plurality of disks, the method including:
- A. beginning from a first sector on a first surface of a first disk of the plurality of disks, writing, with a first head, data contiguously to sectors on the first surface of the first disk from the first sector on the first disk to the last sector on the first surface of the first disk;
- B. writing, with a second head, data contiguously to sectors on a second surface of the first disk from the last sector on the second surface of the first disk to the first sector on the second surface of the first disk;

wherein spare sectors associated with the sectors written to the first surface of the first disk by the first head are written to the first surface of the first disk by the first head and spare sectors associated with the sectors written to the second surface of the first disk by the second head are written to the second surface of the first disk by the second head.

9 Claims, 4 Drawing Sheets

SYSTEM AND METHOD FOR WRITING DATA TO A DISK DRIVE ASSEMBLY TO MINIMIZE THE EFFECT OF A SINGLE HEAD FAILURE

FIELD OF THE INVENTION

The present invention relates generally to a system and method for writing data to a disk drive assembly and more particularly to a system and method for writing data to a disk drive assembly in a manner that minimizes the effect of a single head failure by writing the data to the disks in a contiguous manner.

BACKGROUND OF THE INVENTION

A typical hard disk drive assembly includes a plurality of disks mounted on a spindle and a head assembly for writing data to each surface of each of the disks. A separate head is used to write data to and read data from each surface of each disk. Data stored on a hard disk drive is typically accessed by three parameters: the heads, each being associated with a particular surface of a particular disk; cylinders, each including data accessed at a given radius for a single revolution of the disks, on all surfaces of the disks in the hard disk drive; and sectors, which are specific-size pieces of data, typically 512 Kb, within a given revolution of a disk.

On most disk drives, data is laid out on the disks starting at the beginning of a cylinder and proceeding to the end of the cylinder before moving to the next cylinder. FIG. 1 is a schematic diagram showing this method of writing data to a hard disk drive. As shown in FIG. 1, data is written to each sector of the first cylinder (Cylinder 0) with each head, Head 0 through the last or maximum head (Max Head). Cylinder 1 is then written to in descending order of the heads, from the Max Head to Head 0. Each cylinder is written to in this manner until the ending sector on the last or maximum cylinder (Max Cylinder) is written to.

An alternative method of writing data to a hard disk drive involves writing data to more than one cylinder for each head before proceeding to the next head. FIG. 2 is a schematic diagram showing this method of writing data to a hard disk drive. As shown in FIG. 2, data is written to Cylinders 0 through N with Head 0, before switching to Head 1 to write to Cylinders N through 0. Each head writes to the same number of cylinders until the last or maximum head (Max Head). Cylinders N+1 through the last or maximum cylinder (Max Cylinder) are then written to with each of Heads 0 through the Max Head.

While these methods of writing data to a hard disk drive may be efficient from a data writing and reading perspective, if one of the heads fails, the data that is available to be read is not easily recovered, since there are many non-contiguous ranges of sectors that will not be readily recoverable because of the failed head.

SUMMARY OF THE INVENTION

The present invention is directed to a system and method for writing data to a disk drive assembly to minimize the effect of a single head failure. The method involves writing data to all sectors of a first surface of a disk with a first head, before writing to all sectors of a second surface of the first disk with a second head and writing to all sectors of subsequent surfaces of subsequent disks with subsequent heads. The method includes allocating spare sectors for each head on the same surface to which the head writes.

According to one embodiment, a method of writing data to a disk drive system including a plurality of disk surfaces and a plurality of heads, each head for writing data to one of the plurality of disk surfaces, includes:

A. writing data to all sectors of a first surface of a first disk with a first head;

B. subsequently writing data to all sectors of a subsequent surface of the first disk with a subsequent head; and C. allocating spare sectors for a particular head to be located on the particular surface of the disk with which the particular head is associated.

According to another embodiment, a method of writing data to a disk drive system including a plurality of disk surfaces and a plurality of heads, each head for writing data to one of the plurality of disk surfaces, includes:

A. writing data to all tracks of a first surface of a first disk with a first head;

B. subsequently writing data to all tracks of a subsequent surface of a subsequent disk with a subsequent head; and C. allocating spare sectors for a particular head to be located within tracks located on the particular surface of the disk with which the particular head is associated.

According to another embodiment, a disk drive system includes a disk drive assembly including a number N of disk surfaces, wherein N is greater than one; N heads for writing data to the N disk surfaces, each head being configured for writing data to a different one of the N disk surfaces; and a controller for coordinating the writing of data to the disk surfaces by the heads such that a first head contiguously writes data to all sectors of a first disk surface and a subsequent head contiguously writes data to all sectors of a subsequent disk surface. Spare sectors associated with the first head are allocated on the first disk surface and spare sectors associated with the subsequent head are allocated on the subsequent disk surface.

According to another embodiment, a method of writing data to a disk drive system including a plurality of disk surfaces and a plurality of heads, each head for writing data to one of the plurality of disk surfaces, each disk surface including N sectors, includes:

A. writing data to all N sectors of a first disk surface with a first head;

B. subsequently writing data to all N sectors of a subsequent disk surface with a subsequent head; and C. allocating spare sectors for a particular head to be located on the particular disk surface with which the particular head is associated.

According to another embodiment, a method of writing data to a disk drive system including a plurality of disks and a plurality of heads, each head for writing data to a plurality of sectors on a surface of one of the plurality of disks, includes:

A. beginning from a first sector on a first surface of a first disk of the plurality of disks, writing, with a first head, data contiguously to sectors on the first surface of the first disk from the first sector on the first disk to the last sector on the first surface of the first disk;

B. writing, with a second head, data contiguously to sectors on a second surface of the first disk from the last sector on the second surface of the first disk to the first sector on the second surface of the first disk;

wherein spare sectors associated with the first head are allocated on the first surface of the first disk and spare sectors associated with the second head are allocated the second surface of the first disk.

The method may further include writing, with a subsequent head, data contiguously to all sectors on a first surface of a subsequent disk; wherein spare sectors associated with the subsequent head are allocated on the first surface of the subsequent disk.

According to another embodiment, a method of writing data to a disk drive system including a plurality of disk surfaces and a plurality of heads, each head for writing data to one of the plurality of disk surfaces, includes:

A. beginning from a first sector on a first disk surface, writing, with a first head, data contiguously to sectors on the first disk surface from the first sector on the first disk surface to the last sector on the first disk surface;

B. writing, with a second head, data contiguously to sectors on a second disk surface from the last sector on the second disk surface to the first sector on the second disk surface;

wherein spare sectors associated with the first head are allocated on the first disk surface and spare sectors associated with the second head are allocated on the second disk surface.

The method may further include writing, with a subsequent head, data contiguously to all sectors on a subsequent disk surface, wherein spare sectors associated with the subsequent head are written to the subsequent disk surface.

According to yet another embodiment, a disk drive system includes a disk drive assembly including a number N of disks; 2N heads for writing data to the N disks, each head being configured for writing data on one surface of a different one of the disks; and a controller for coordinating the writing of data to the disks by each of the heads such that a first head contiguously writes data to all sectors of a first side of a first disk and a second head contiguously writes data to all sectors of a second side of the first disk. Spare sectors associated with the first head are written to the first surface of the first disk and spare sectors associated with the second head are written to the second surface of the first disk.

BRIEF DESCRIPTION OF THE DRAWINGS

These and other features of the invention will become more readily apparent from the following detailed description when read together with the accompanying drawings, in which.

DETAILED DESCRIPTION

Figure 1:
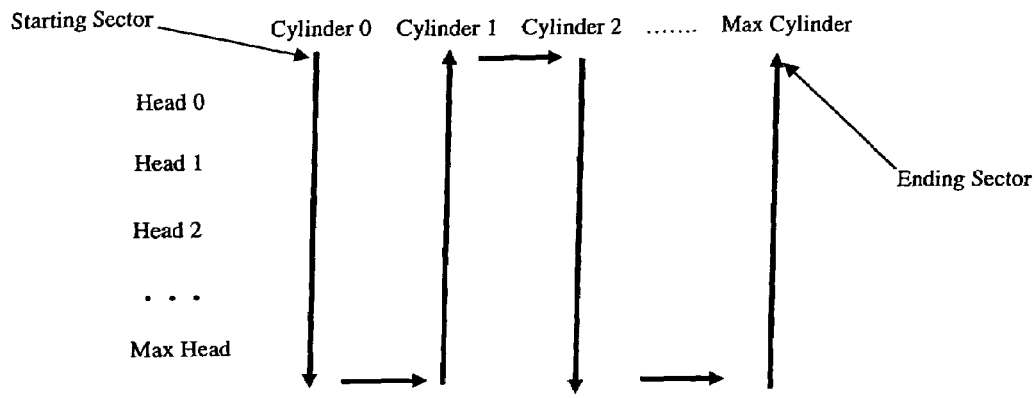
FIG. 1 is a schematic diagram showing a prior art method of writing data to a plurality of disks in a disk drive system.
Figure 2:
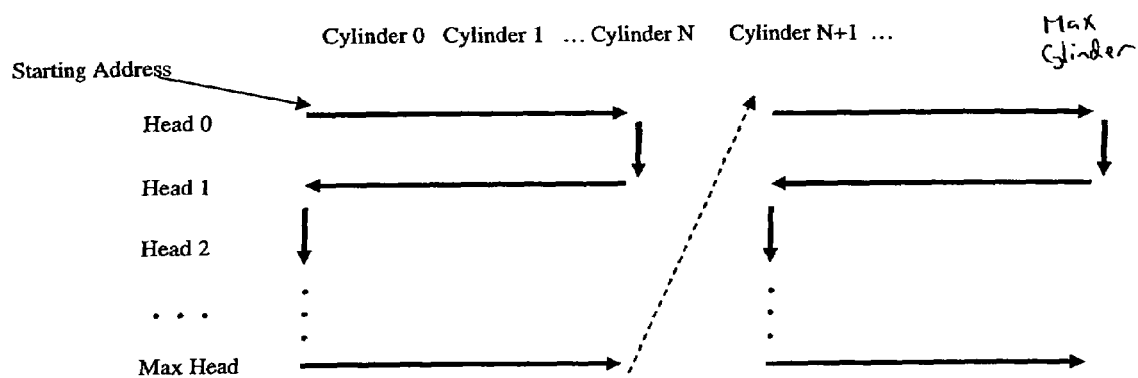
FIG. 2 is a schematic diagram showing a another prior art method of writing data to a plurality of disks in a disk drive system.
Figure 3:
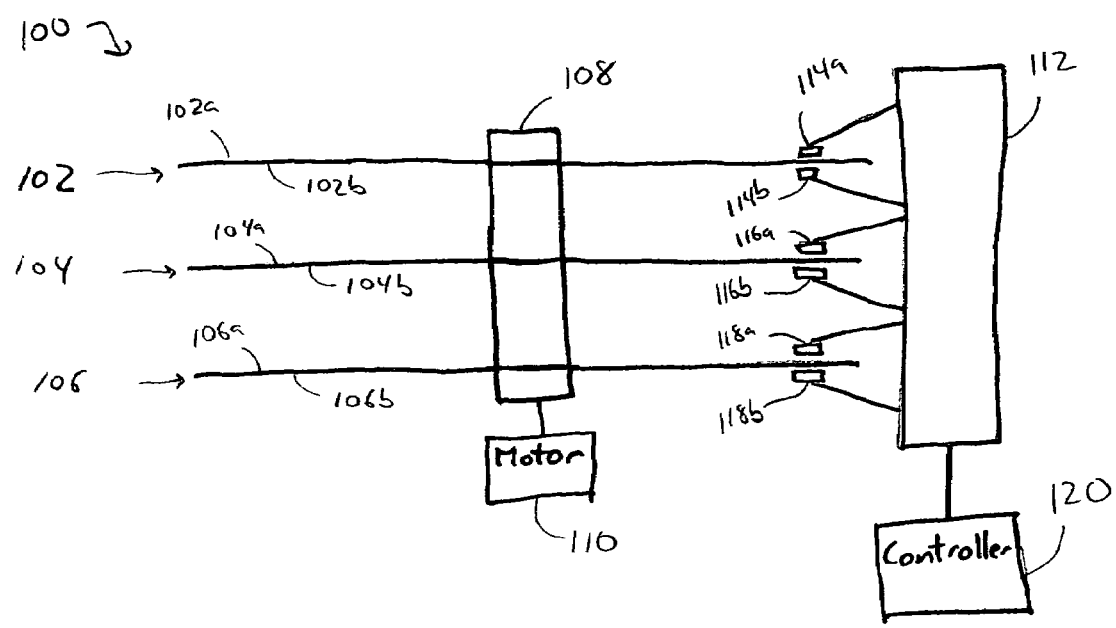
FIG. 3 is a schematic diagram of a disk drive system with which the method of present invention is implemented.

FIG. 3 is a schematic diagram of a disk drive system 100 which implements the method of writing data in accordance with the present invention. Disk drive system 100 includes a plurality of hard disks 102, 104, 106, each having first and second surfaces, 102a, 102b, 104a, 104b, 106a and 106b, respectively. Hard disks 102-106 are mounted on a spindle 108 which is driven by a motor 110. Head actuation assembly 112 includes a plurality of heads, each configured to write to one surface of one of the disks 102-106. Specifically, heads 114a and 114b are configured to write to surface 102a and surface 102b, respectively, heads 116a and 116b are configured to write to surface 104a and surface 104b, respectively, and heads 118a and 118b are configured to write to surface 106a and surface 106b, respectively. Head actuation assembly 112 receives head actuation instructions from a controller 120, which controls the writing and reading operations of the heads. While, in FIG. 3 there are only three hard disks shown, it will be understood that disk drive system 100 may include any number of hard disks which may be written to according to the method of the present invention.

Figure 4:
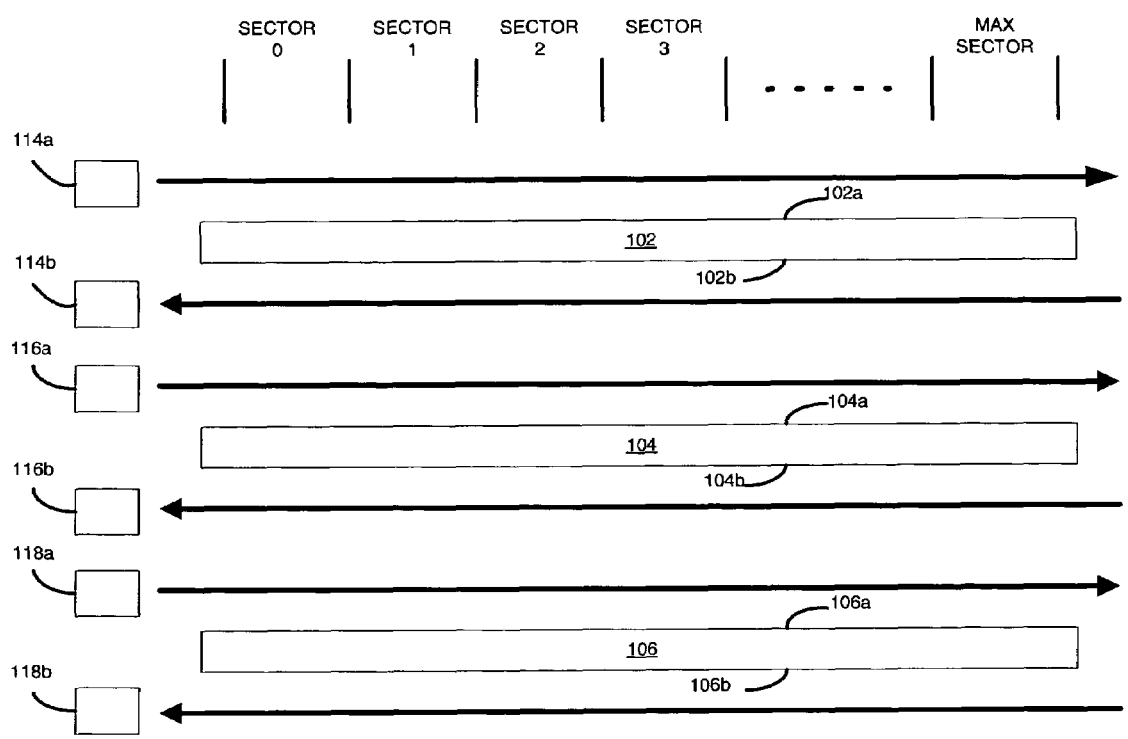
FIG. 4 is a schematic diagram showing the method of writing data to a plurality of disks in a disk drive system in accordance with the present invention.
Figure 5:
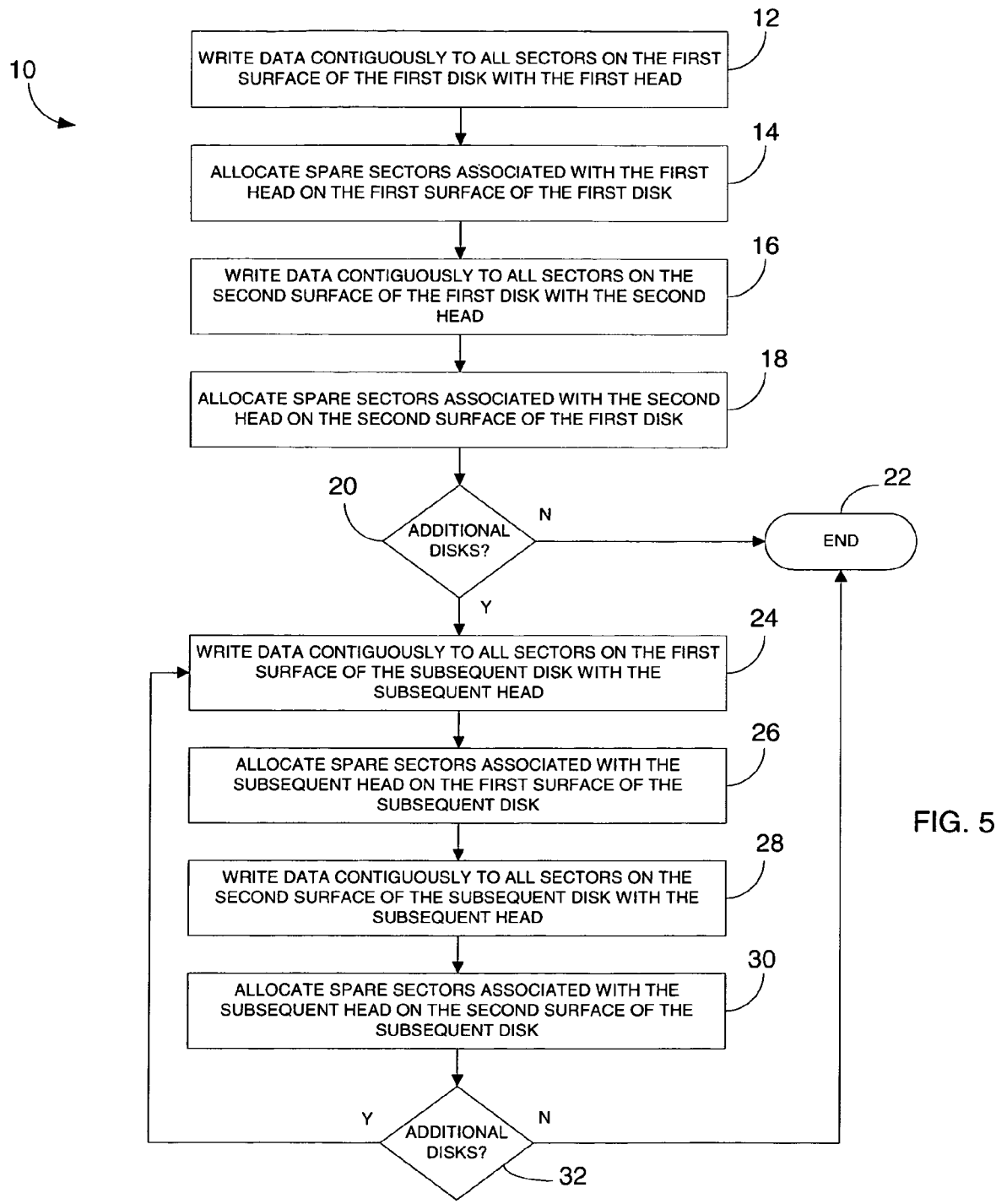
FIG. 5 is a flow diagram showing the method of writing data to a plurality of disks in a disk drive system in accordance with the present invention.

Referring now to FIG. 4 and FIG. 5, the method of writing data to a disk drive to minimize the effect of a single head failure will be described. FIG. 4 is a schematic diagram showing how data is written to the hard disks of the disk drive system 100, and FIG. 5, is a flow diagram 10 showing the steps involved in the method. Beginning with Step 12, data is contiguously written to every sector, Sectors 0 through the Max Sector, on the first surface 102a of the first disk 102 with the first head 114a. Spare sectors associated with the data written by the first head 114a are allocated to the first surface 102a of the first disk 102, Step 14. Next, in Step 16, data is contiguously written to every sector, Max Sector through Sector 0, on the second surface 102b of the first disk 102 with the second head 114b. Spare sectors associated with the data written by the second head 114b are allocated to the second surface 102b of the first disk 102, Step 18. If there are no more disks in the disk drive system to be written on, Step 20, the writing process ends at Step 22.

If additional disks are to be written to, Step 20, the method proceeds to Step 24, where data is contiguously written to every sector, Sectors 0 through the Max Sector, on the first surface of the subsequent disk with the subsequent head associated with the first surface of the subsequent disk. Spare sectors associated with the data written by the associated subsequent head are allocated to the first surface of the subsequent disk, Step 26. Next, in Step 28, data is contiguously written to every sector, Max Sector through Sector 0, on the second surface of the subsequent disk with the subsequent head associated with the second surface of the subsequent disk. Spare sectors associated with the data written by the associated subsequent head are allocated to the second surface of the subsequent disk, Step 30. If there are no more disks in the disk drive system to be written to, Step 32, the writing process ends at Step 22. If there are more disks to be written to, the method returns to Step 24 to continue writing to subsequent disks.

Specifically applied to the disk drive system shown in FIGS. 3 and 4, the loop including Steps 24 through 32 would be applied to data being written to disks 104 and 106. Beginning with Step 24, data is contiguously written to every sector, Sectors 0 through the Max Sector, on the first surface 104a of the second disk 104 with the head 116a. Spare sectors associated with the data written by the head 116a are allocated to the first surface 104a of the second disk 104, Step 26. Next, in Step 28, data is contiguously written to every sector, Max Sector through Sector 0, on the second surface 104b of the second disk 104 with the head 116b. Spare sectors associated with the data written by the head 116b are allocated to the second surface 104b of the second disk 104, Step 30.

Since there is a third disk remaining to be written to, Step 32, data is contiguously written to every sector, Sectors 0 through the Max Sector, on the first surface 106a of the third disk 106 with the head 118a. Spare sectors associated with the data written by the head 118a are allocated to the first surface 106a of the third disk 106, Step 26. Next, in Step 28, data is contiguously written to every sector, Max Sector through Sector 0, on the second surface 106b of the third disk 106 with the head 118b. Spare sectors associated with the data written by the head 118b are allocated to the second surface 106b of the third disk 104, Step 30.

In the event that one of the heads should fail, only contiguous data sectors written to the disk surface associated with the failed head will be lost, while all other contiguous data sectors written to the remaining surfaces of the disk drive system with the remaining heads will be accessible. This prevents the loss of many non-contiguous ranges of data sectors resulting from to the failure of a single head, which occurs in the prior art systems.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A method of writing data to a disk drive system including a plurality of disk surfaces and a plurality of heads, each head for writing data to one of the plurality of disk surfaces, the method comprising:
   A. writing data to all sectors of a first surface of a first disk with a first head;
   B. subsequently writing data to all sectors of a subsequent surface of the first disk with a subsequent head; and
   C. allocating spare sectors for a particular head to be located on the particular surface of the disk with which the particular head is associated.

2. A method of writing data to a disk drive system including a plurality of disk surfaces and a plurality of heads, each head for writing data to one of the plurality of disk surfaces, the method comprising:
   A. writing data to all tracks of a first surface of a first disk with a first head;
   B. subsequently writing data to all tracks of a subsequent surface of a subsequent disk with a subsequent head; and
   C. allocating spare sectors for a particular head to be located within tracks located on the particular surface of the disk with which the particular head is associated.

3. A disk drive system comprising:
   a disk drive assembly including a number N of disk surfaces, wherein N is greater than one;
   N heads for writing data to the N disk surfaces, each head being configured for writing data to a different one of the N disk surfaces; and
   a controller for coordinating the writing of data to the disk surfaces by the heads such that a first head contiguously writes data to all sectors of a first disk surface and a subsequent head contiguously writes data to all sectors of a subsequent disk surface;
   wherein spare sectors associated with the first head are allocated on the first disk surface and spare sectors associated with the subsequent head are allocated on the subsequent disk surface.

4. A method of writing data to a disk drive system including a plurality of disk surfaces and a plurality of heads, each head for writing data to one of the plurality of disk surfaces, each disk surface including N sectors, the method comprising:
   A. writing data to all N sectors of a first disk surface with a first head;
   B. subsequently writing data to all N sectors of a subsequent disk surface with a subsequent head; and
   C. allocating spare sectors for a particular head to be located on the particular disk surface with which the particular head is associated.

5. A method of writing data to a disk drive system including a plurality of disks and a plurality of heads, each head for writing data to a plurality of sectors on a surface of one of the plurality of disks, the method comprising:
   A. beginning from a first sector on a first surface of a first disk of the plurality of disks, writing, with a first head, data contiguously to sectors on the first surface of the first disk from the first sector on the first disk to the last sector on the first surface of the first disk;
   B. writing, with a second head, data contiguously to sectors on a second surface of the first disk from the last sector on the second surface of the first disk to the first sector on the second surface of the first disk;
   wherein spare sectors associated with the first head are allocated on the first surface of the first disk and spare sectors associated with the second head are allocated the second surface of the first disk.

6. The method of claim 5 further comprising:
   C. writing, with a subsequent head, data contiguously to all sectors on a first surface of a subsequent disk; wherein spare sectors associated with the subsequent head are allocated on the first surface of the subsequent disk.

7. A method of writing data to a disk drive system including a plurality of disk surfaces and a plurality of heads, each head for writing data to one of the plurality of disk surfaces, the method comprising:
   A. beginning from a first sector on a first disk surface, writing, with a first head, data contiguously to sectors on the first disk surface from the first sector on the first disk surface to the last sector on the first disk surface;
   B. writing, with a second head, data contiguously to sectors on a second disk surface from the last sector on the second disk surface to the first sector on the second disk surface;
   wherein spare sectors associated with the first head are allocated on the first disk surface and spare sectors associated with the second head are allocated on the second disk surface.

8. The method of claim 7 further comprising:
   C. writing, with a subsequent head, data contiguously to all sectors on a subsequent disk surface, wherein spare sectors associated with the subsequent head are written to the subsequent disk surface.

9. A disk drive system comprising:
   a disk drive assembly including a number N of disks;
   2N heads for writing data to the N disks, each head being configured for writing data on one surface of a different one of the disks; and
   a controller for coordinating the writing of data to the disks by each of the heads such that a first head contiguously writes data to all sectors of a first side of a first disk and a second head contiguously writes data to all sectors of a second side of the first disk;
   wherein spare sectors associated with the first head are written to the first surface of the first disk and spare sectors associated with the second head are written to the second surface of the first disk.

* * * * *